United States Patent
Hattersley et al.

(10) Patent No.: US 7,370,801 B2
(45) Date of Patent: May 13, 2008

(54) OPTICAL SYMBOL SCANNER AND ILLUMINATOR WITH POWERED SOCKET

(75) Inventors: John R. Hattersley, Skaneateles, NY (US); Francis O. Blackwell, III, Auburn, NY (US)

(73) Assignee: Industrial Data Entry Automation Systems Incorporated, Skaneateles, NY (US)

( * ) Notice: Subject to any disclaimer, the term of this patent is extended or adjusted under 35 U.S.C. 154(b) by 0 days.

(21) Appl. No.: 11/481,311

(22) Filed: Jul. 5, 2006

(65) Prior Publication Data

US 2008/0006699 A1    Jan. 10, 2008

(51) Int. Cl.
 *G06K 7/10* (2006.01)
(52) U.S. Cl. .................... 235/462.43; 235/462.42; 235/462.45; 235/472.01
(58) Field of Classification Search ........... 235/462.42, 235/462.43, 462.45, 462.47
See application file for complete search history.

(56) References Cited

U.S. PATENT DOCUMENTS

| | | | | |
|---|---|---|---|---|
| 4,210,802 A | * | 7/1980 | Sakai | ................. 235/483 |
| 5,572,006 A | * | 11/1996 | Wang et al. | ................. 235/454 |
| 5,661,634 A | * | 8/1997 | Obata et al. | ................. 361/684 |
| 5,756,981 A | * | 5/1998 | Roustaei et al. | ........ 235/462.42 |
| 5,811,784 A | * | 9/1998 | Tausch et al. | .......... 235/472.01 |
| 6,352,204 B2 | * | 3/2002 | Hattersley et al. | ...... 235/472.01 |
| 6,824,061 B1 | * | 11/2004 | Hattersley et al. | ...... 235/472.01 |
| 6,832,725 B2 | * | 12/2004 | Gardiner et al. | ........ 235/462.21 |
| 2002/0000472 A1 | * | 1/2002 | Hattersley et al. | ...... 235/472.01 |
| 2007/0119949 A1 | * | 5/2007 | Hattersley et al. | ...... 235/472.01 |

* cited by examiner

*Primary Examiner*—Michael G. Lee
*Assistant Examiner*—Paultep Savusdiphol
(74) *Attorney, Agent, or Firm*—Bernhard P. Molldrem, Jr.

(57) ABSTRACT

A hand-held, compact fixed mounted or mobile optical symbol scanner assembly has a powered socket into which an active or passive illumination module can be installed. The socket has a recess centered at the optic axis, and the illumination attachment module has a male projection that plugs into this recess. Probe type electrodes on the attachment module fit into female socket electrodes on the socket member, so that power can be derived from the scanner for LEDs in the module. The module may convert the voltage to a level suitable for higher wavelengths, and may provide added control of the external LEDs to extend battery life.

15 Claims, 4 Drawing Sheets

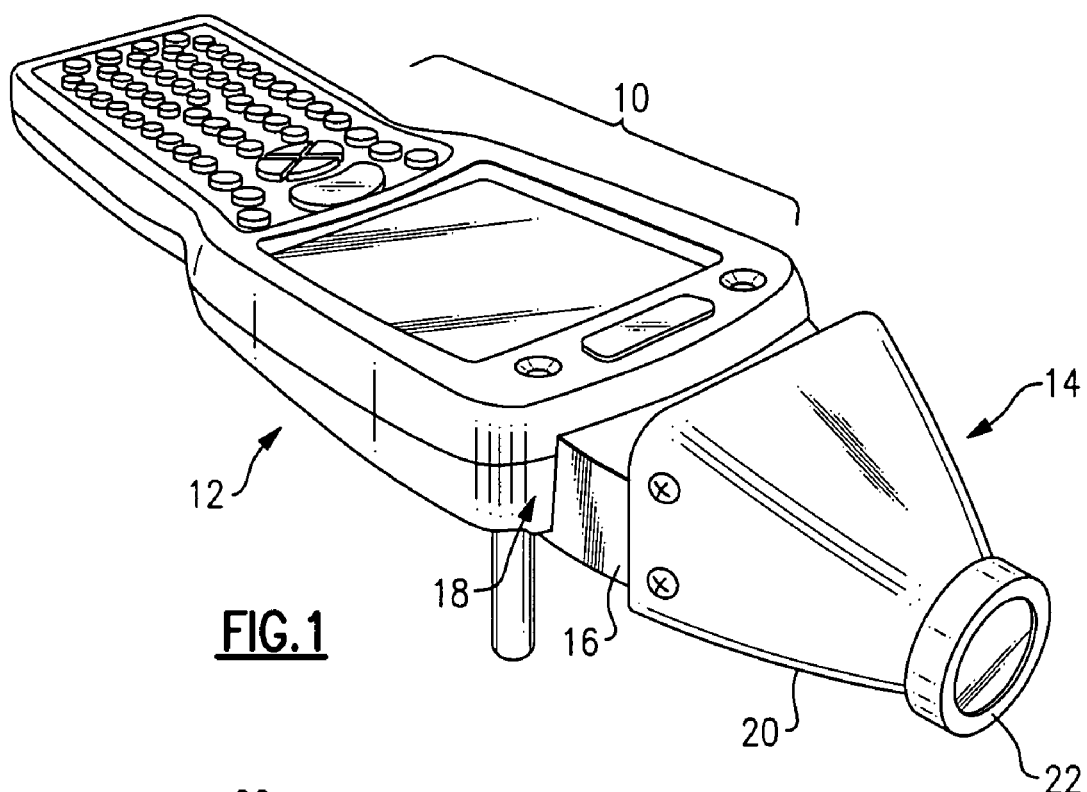
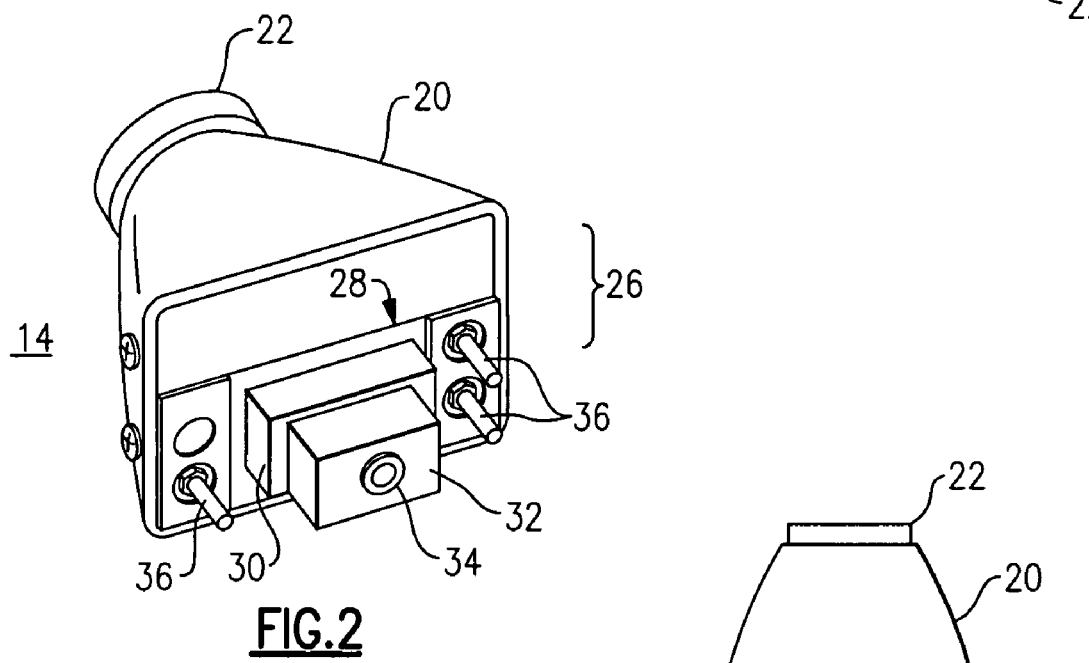
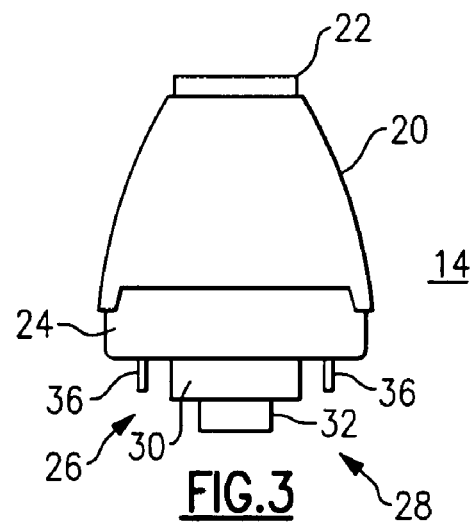

OPTICAL SYMBOL SCANNER AND ILLUMINATOR WITH POWERED SOCKET

BACKGROUND OF THE INVENTION

This invention is directed to optical scanning devices, such as bar code scanners, and is more particularly concerned with an arrangement for adapting the device for reading difficult optical symbols, e.g., small linear or two-dimensional symbols directly marked on articles, or for reading luminescent bar codes that require special black light wavelengths. The invention is more particularly concerned with a combination of a hand-held optical scanner and an illuminator that can be plugged into the scanner, i.e., removably installed so the scanner may be employed either with an illuminator attachment for reading a variety of difficult bar codes or special bar coded symbols, or without the attachment for reading normal bar codes. The device may be a hand-held scanner, either cordless or corded, or the scanner may be built into a data terminal or may be of a compact, fixed mount style.

Within the past several years, two-dimensional bar code systems have begun to be employed on small articles so that the article can be tracked throughout manufacturing, packaging, and shipping. In some cases, luminescent or fluorescent bar code symbols are invisibly printed onto articles, e.g., onto the base or bottom of a pharmaceutical vial to identify the contents, as well as to provide information about the batch number, date and place of manufacture. Where 2-D symbols are used, these can carry all the required information within a square that may typically be only three to six millimeters on a side. The symbols can be thermally transferred, screen printed or ink-jet printed directly onto the surface of the pharmaceutical vial or other article. At present, machine-mounted camera-based scanner systems are employed, in which the articles proceed past the scanner station, and the articles receive illumination from a discharge-tube type black light source. These scanner systems are bulky and non-portable, so they cannot be carried by an operator. This makes it impossible to read the bar codes in a warehouse, shipping dock or receiving dock environment where the workers could be provided with hand-held scanners. In addition, because of the rather harmful effects from ultraviolet radiation, conventional black light sources typically have to be shielded to protect the workers from exposure to skin or eyes. Consequently, invisibly printed fluorescing bar code symbols can only be read under special circumstances, as the bulk, weight, and complexity of the reader equipment has limited their widespread usage.

Recently, short-wavelength light emitting diodes (LEDs) have been introduced. Such LEDs can emit light in the deep blue to near UV region of the spectrum, and can be used to produce black-light illumination. These have been used notably, in combination with an encapsulation of luminescent phosphors, to create so-called white LEDs, in which the short-wavelength light stimulates the phosphors to create a blend of red, green, and blue light. No one previously had considered using black-light emitting diodes in connection with any sort of hand-held scanner device to permit their use in reading "invisible" luminescent or fluorescent optical symbols, such as bar codes.

More recently, the same inventors involved here have produced a scanner which employs black light LEDs for illumination in the blue-violet and near UV region for illuminating bar code symbols that are printed in phosphorescent, luminescent or fluorescent inks. This scanner is described in U.S. Pat. No. 6,824,061, Nov. 30, 2004. The scanner had employed a hollow nosepiece with an opaque shell that concentrates the illumination on the fluorescent target and also helps shield the operator from stray short-wavelength illumination. The nosepiece also keeps ambient light from flooding the imager within the scanner.

Quite recently, fluorescent or luminescent inks have been developed that can be stimulated at visible wavelengths and will produce light at a slightly longer visible wavelength. Other possible inks respond to visible light with fluorescence in the IR region. However, prior hand held scanners are unable to discern bar coded symbols formed of these fluorescent inks, because of the low contrast between the target and background.

Also, some bar code symbols are embossed, etched, or peened onto a smooth reflective surface and these symbols have been difficult or impossible to read, unless a special illuminator is in place on the scanner. One example of such a mirror image scanning attachment is described in U.S. Pat. No. 6,854,650.

It has been desired that any given scanner be able to be used with a number of different types of bar code in various conditions. However, as the special bar codes require illuminators with special wavelengths or with prisms designed to present the illumination at a small angle, the bar code scanners have had to be specially constructed for each type of bar code or each environment. Thus, a need has arisen for a mechanism to permit various illuminators to be used interchangeably with a given scanner, or alternatively to permit the illuminator to be installed interchangeably on a variety of different bar code scanners.

OBJECTS AND SUMMARY OF THE INVENTION

Accordingly, it is an object of this invention to provide an optical symbol scanner that avoids the drawbacks of the prior art.

It is another object to provide a hand-held scanner, fixed, or other scanner with a mechanism to permit it to read standard printed bar code symbols, difficult-to-read special bar code symbols, or invisibly printed fluorescent optical symbols.

It is a further object to provide a hand-held scanner and a plug-in illuminator that permits a user to read and accurately decode special symbols, such as a fluorescent or luminescent symbol that has been directly printed on an article and which scanner employs one or more low-power far-blue, UV/blue, UV or similar black-light source, or, in some cases, a visible light source, with the source of illumination being contained within the plug-in illuminator.

It is a similar object to provide a hand-held scanner and interchangeable illuminator where the power for the illumination source within the illuminator is obtained from the scanner, by means of electrical contacts in the illuminator that mate with contact electrodes in the socket portion that is affixed to the front or distal end of the scanner.

It is a more specific object that a black-light illumination source (or visible-light illumination source) be incorporated into the plug-in illuminator, including any circuitry necessary to provide the correct voltage levels for LEDs to produce their illumination.

According to one aspect of this invention, a hand-held, portable or compact, fixed mount scanner device has a housing, with a distal face and light-generating means on or in the distal face of the housing, to produce illumination that is to fall upon the optical symbol in the view of the scanner device. A focusing lens group is positioned on the optic axis of the scanner for focusing an image of the symbol onto a solid-state imager device positioned proximally of the lens group within the scanner device. There is electrical power and control circuitry within the scanner for activating and powering the light-generating means when triggered. The scanner can typically be provided with a finger lever for triggering the imager device and the electrical power and control circuitry, although this triggering can be carried out remotely under control of an automated sensor, in the case of a machine-mounted scanner.

A removable and interchangeable, i.e., plug-in illuminator module is adapted to be mounted upon the distal face of the scanner device. This module has a main housing or body portion. There is an optical return pathway within the body portion that permits the light from the optical symbol to pass therethrough along the optic axis. The illuminator attachment module also contains within its body portion a set of LEDs or other illumination generating means. These LEDs are adapted for generating illumination at a predetermined wavelength or wavelengths. A light directing arrangement, e.g., prisms or light conduits, conduct the illumination produced from these LEDs or other illumination generating means so that it is directed to the optical symbol target. These may be shaped to present the illumination at a desired angle.

At the same time, a socket member is situated upon the distal face of the scanner device so that the illuminator module can be plugged in when needed, and can be removed or interchanged, or installed on another scanner. This socket has a recess centered upon the scanner optic axis. The socket also has a plurality of contact electrodes disposed outside, i.e., to the left and right, of the recess. These contact electrodes are electrically coupled to respective circuit points of the electrical power and control circuitry of the scanner. The illumination module incorporates a plug-in male member disposed on a proximal side thereof. In order to mate with the socket, the male member has a projection thereon adapted to mate with the recess on the socket member. This projection is centered on the optical return pathway. Likewise, there are a plurality of electrode members disposed outside, i.e., to left and right, of the projection, and these electrode members are adapted to contact the respective contact electrodes of the socket member. These effect the connection from the electrical power and control circuitry of the scanner to the illumination generating means, i.e., the LEDs, in the plug-in illuminator module, so that electrical power is provided from the scanner to the attachment module.

Favorably, the attachment can be configured as a nosepiece, with a shield or shroud. When the attachment module is mounted on the distal face of the scanner device, it has its internal optical passageway arranged so that its optic axis is aligned with the optic axis of the scanning device. There is an open channel within the shield for the illumination and this channel conducts the illumination, that is, directs and guides the illumination so that the illumination impinges on the symbol and the scanner device views an image of the symbol. The optional shield or shroud may be hollow or not, but should define pathways that are optically clear for the wavelengths that need to travel on those pathways.

In some preferred embodiments, the illuminator module can include a shroud, with the optical passageway thereof having its optic axis aligned with the optic axis of said scanning device. In the case of an illumination attachment for luminescent targets or symbols, the LEDs or other illumination generating means in the module can incorporate one or more diodes that generate a predetermined black light wavelength appropriate for the luminescent targets or symbols. The luminescent materials of those symbols respond and emit light of another wavelength. In this case, the shroud has a channel within it for directing and guiding the stimulating illumination, e.g., black light. A narrow distal end of the shroud may have an optional flat plate that is transparent to radiation at the black light wavelength and the other wavelength. The shroud can favorably be formed with a tapered opaque shell that narrows in the direction towards the distal end, such that the radiation at said black light wavelength impinges on the symbol and the scanner device views the symbol as radiation at the other wavelength as produced by said fluorescent markings. Stray emission of the black light is reduced or eliminated, and the viewing parts of the scanning device are also shielded from much of the ambient light. The plate of transparent material at the narrow distal end can be oriented at a non-right angle to said optic axis such that the light that hits the plate is not reflected directly back to the imager device.

Favorably, the illumination generating circuitry within the body of the illuminator module has an electric drive circuit, e.g., a DC-DC converter, that produces a proper forward voltage and current to each of the LEDs.

In one favorable illustrative embodiment, for keyed insertion purposes, the recess of the socket member has a distal rectangular cavity of a first width and first length, and a second proximal rectangular cavity of a second width and second length, smaller than said first width and first length, respectively. That is, there are first and second cavity portions of stepped up dimensions. To mate with this, the projection on the male plug-in member has a proximal rectangular portion of substantially the same second width and second length and a distal rectangular portion of substantially the same first width and said first length, such that said projection fits snugly into the recess.

In this embodiment, the contact electrodes in the socket member include female recessed contact electrodes situated at right and left sides of the socket member beyond the sides of the rectangular cavity. The electrode members on the male plug-in portion of the illuminator module are in the form of male probe contacts that are adapted to seat within respective ones of the above-mentioned female recessed contact electrodes.

The circuit points of the electrical power and control circuitry in the scanner are connected via the contact electrodes and associated electrode members to the illumination generating means of the illuminator module, and are operative to provide power, ground return, and trigger signal to the illuminator attachment module. The electrical power and control circuitry can be operative to disable the light-generating means of the illumination module when said illumination module and said plug-in male member has been situated in said socket member on battery-operated devices. In this way, the illuminator LEDs are employed only at key moments for reading a bar code or other optical symbol. However, in some cases, it may be desirable to supply supplemental illumination in the illuminator, in addition to the light produced from the internal LEDs within the scanner. In that case, the two light sources would be used together. For some applications, a passive illuminator (i.e., without its own LEDs or circuitry) can be used. This would have the same male plug-in portion, without requiring the electrode members or probes. This configuration can be used for a low angle illumination requirement or for reading a mirror-surface bar code symbol.

The above and many other objects, features, and advantages of this invention will present themselves to persons skilled in this art from the ensuing description of preferred embodiments of this invention, as described with reference to the accompanying Drawing.

BRIEF DESCRIPTION OF THE DRAWING

FIG. 1 is a perspective view of a portable data terminal with integral bar code scanner and with an interchangeable illuminator, according to an embodiment of this invention.

FIG. 2 is a rear perspective view of the interchangeable illuminator of this embodiment.

FIG. 3 is a top plan view of the illuminator of this embodiment.

DETAILED DESCRIPTION OF THE PREFERRED EMBODIMENT(S)

Figure 4:
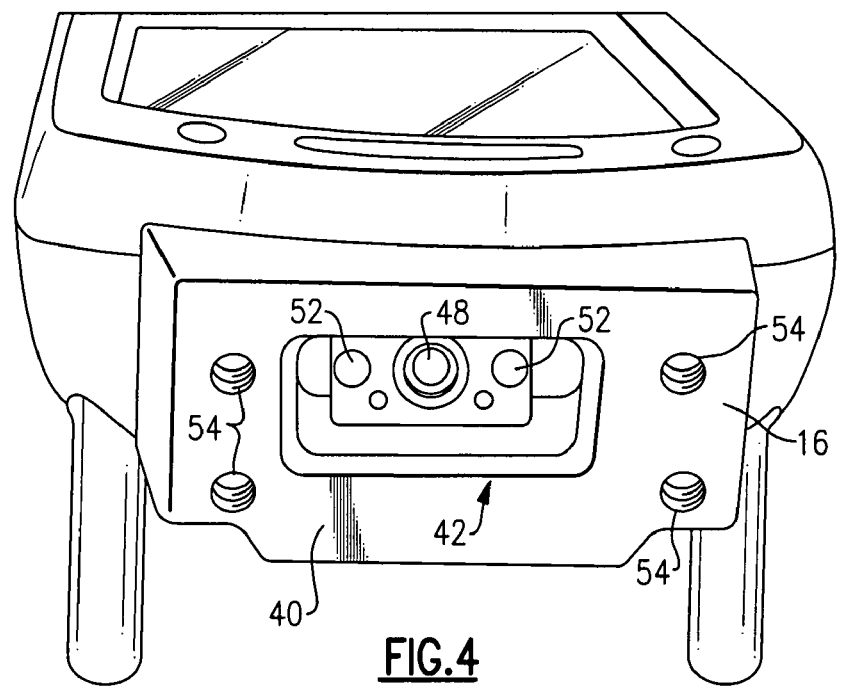
FIG. 4 is a front perspective view of the portable data terminal with integral scanner, illustrating the socket portion for receiving the illuminator.

With reference to the Drawing, and initially to FIG. 1, an optical symbol scanner assembly 10 combines a hand-held data inputting scanner 12, i.e., a hand-held two dimensional bar code scanner, with an interchangeable illumination attachment 14. In this embodiment, the illumination attachment 14 is in the form of a generally pyramidal shaped nosepiece. Here, the scanner 12 is a self-contained battery operated unit, with a display for showing the contents of a bar coded symbol, and keys for inputting data. In other embodiments, the scanner can be wirelessly connected with a central computer, or the scanner can be connected via a cable to remote computer.

A socket member 16 is affixed onto a front or distal face 18 of the body of the scanner 12. The interchangeable illuminator attachment 14 plugs in to this socket member 16 as described below. The attachment 14 has an outer shroud 20 that narrows towards its distal end, with an optional front lens or optional transparent cover plate 22 at the distal tip.

In the embodiments of this invention, the bar code symbols or other optical symbols may be linear, 2-D, or 3-D; and the information contained in the bar coded symbol may be used for automated processing in factory, and may also be read using an automated fixed device on a factory line. Here, the hand-held scanner 12 permits a user in a warehouse, shipping location, or at a customer location to check the identity, date and place of manufacture, and contents of an item, all of which data may be contained in the bar coded symbol on the item.

An industrial application of a hand held scanner that has been adapted for reading luminescent or fluorescent bar coded symbols, using black light for illumination, is described in our U.S. Pat. No. 6,824,061, Nov. 30, 2004, and also in our U.S. patent application Ser. No. 11/290,762, Nov. 30, 2005, each of which is incorporated herein by reference.

As shown in FIGS. 2 and 3, the illuminator attachment 14 has a body 24 which may be of a durable plastic material. At a proximal side 26 of the attachment body 24 there is a male projection 28 that is intended to plug in to the socket 16. The projection is of a stepped or shouldered construction for keyed insertion purposes, with a distal rectangular block 30 having a length and width and a proximal rectangular block 32 having length and width dimensions smaller than those of the distal block 30. At the proximal surface of the block 32 is an optical opening or pupil 34 that is disposed along the optical return path for light from a symbol that is being viewed by the scanner. When the attachment 14 is installed, this pupil 34 is centered the optic axis of the scanner 12. Also at the rear or proximal face 26 of the attachment body are a plurality of electrodes, i.e., probes 36, which project in the proximal direction. In this embodiment these electrodes 36 are disposed at the left and right sides of the male projection 28, and one above the other. There can be two, three, or four electrodes, depending upon the optics and electronics within the attachment 34. In a passive optical nosepiece, which functions only to redirect the light generated by the scanner 12 itself, then no electrodes would be needed.

Figure 5:
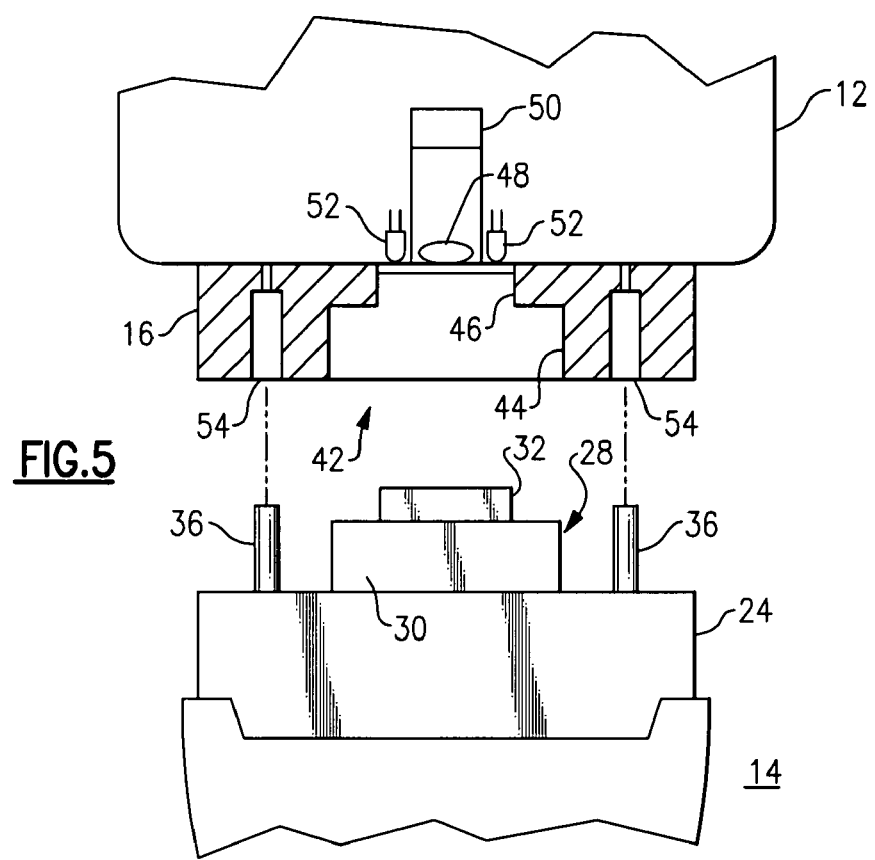
FIG. 5 is a top view partial assembly view of the scanner and illuminator of this embodiment of the invention.

As shown in FIGS. 4 and 5, the socket member 16, which is located at the front or distal face of the scanner 12, has a generally flat distal face 40, and is provided with a stepped or shouldered recess or cutout 42. The cutout has an outer, or distal rectangular portion 44 that matches the dimensions of the block 30 of male projection 28, and a smaller inner, proximal portion 46 that matches the dimensions of the block 32. The recess 42 leaves exposed the focusing optics 48 of the scanner 12, here centered on the device optic axis, with an imaging chip 50 situated within the scanner on the focal plane of the focusing optics 48. A number of internal illuminating LEDs 52 are situated on one or both sides of the focusing optics, and are able to project illumination distally through the cutout 42 of the socket member when the illumination attachment 14 is absent or removed. In this way, the scanner can be used alone for reading most "normal" bar coded symbols, e.g., those printed with black ink on a white diffuse material, and which are visible with normal visible or infrared light.

The socket member 16 also has a number of electrical contacts 54, here in the form of recessed or female electrodes, disposed to the left and right sides of the recess or cutout 42, and one above the other, as shown in FIG. 4. These connect to circuit points within the scanner 12.

Figure 6:
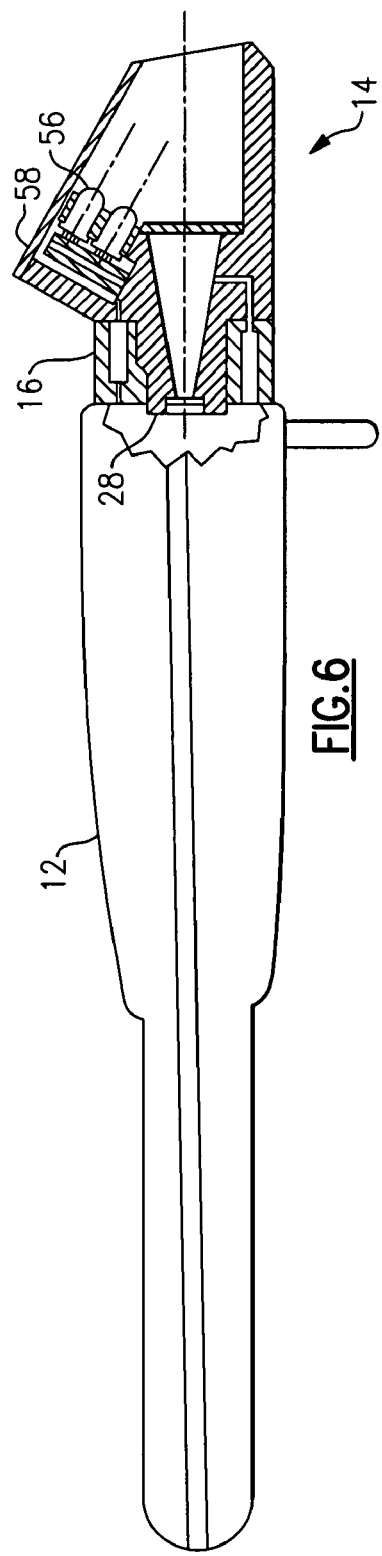
FIG. 6 is side elevation of this embodiment, with the illuminator module shown in section.

As shown in FIG. 6, the illumination attachment 14 is constructed so as to have a hollow interior, providing pathways for the illumination from the LEDs 56 and a return path along the scanner optic axis. Here, the LEDs 56 are mounted on an LED bar above the scanner optic axis. At a window opening at the narrow distal end, the lens or cover plate 22 is positioned. This can be a thin glass plate that serves as a dust barrier window and most favorably is transparent with respect to the illumination from the LEDs 56, e.g., black light, and also to the visible or infrared light produced by the luminescent bar coded symbols. Depending on environmental issues, the cover or window can be omitted or not used. A circuit board 58, which contains the power and control circuitry for the LEDs 56, is connected via internal conductors (not shown) to the contact electrodes 36, 36. The circuitry on the board 58 can include an on-board DC-DC converter, to boost the voltage up to the required voltage and current as needed for the LEDs; and circuitry to adjust the various voltage levels as needed for illumination. This circuit board 58 may also receive a signal so that the external LEDs 56 can be disabled to conserve battery power when they are not required. The optional cover plate 22 is oriented at a tilt, i.e., non-right angle, with respect to the optic axis, so that illumination does not reflect directly back towards the focusing lens 48 and imager chip 50. The attachment or nosepiece 14 of this embodiment may about two inches in length, with the distal window opening being preferably about one-half inch by three-quarters inch, so that a typical 3-mm by 3-mm bar coded symbol (or any of a variety of larger or smaller symbols) can be viewed. The actual dimensions of the window opening are not critical. In this embodiment, the window opening accommodates a field of view of 0.55 inches (14 mm) square. The shroud favorably may comprise a coating of a black (opaque) material on the outside surface. The interior of the attachment 14 serves as a guide for the illumination from the LEDs 56, so that when the target or symbol is properly positioned at the tip or window opening the target can be properly illuminated and scanned. An optical filter 62 may be interposed in the optical return path to pass the visible light from the target, but to block or absorb the wavelengths emitted by the illumination LEDs 56.

For other applications, the removable, interchangeable illumination attachment 14 could be of a different shape, or made with different materials, as suits the specific application.

Figure 7:
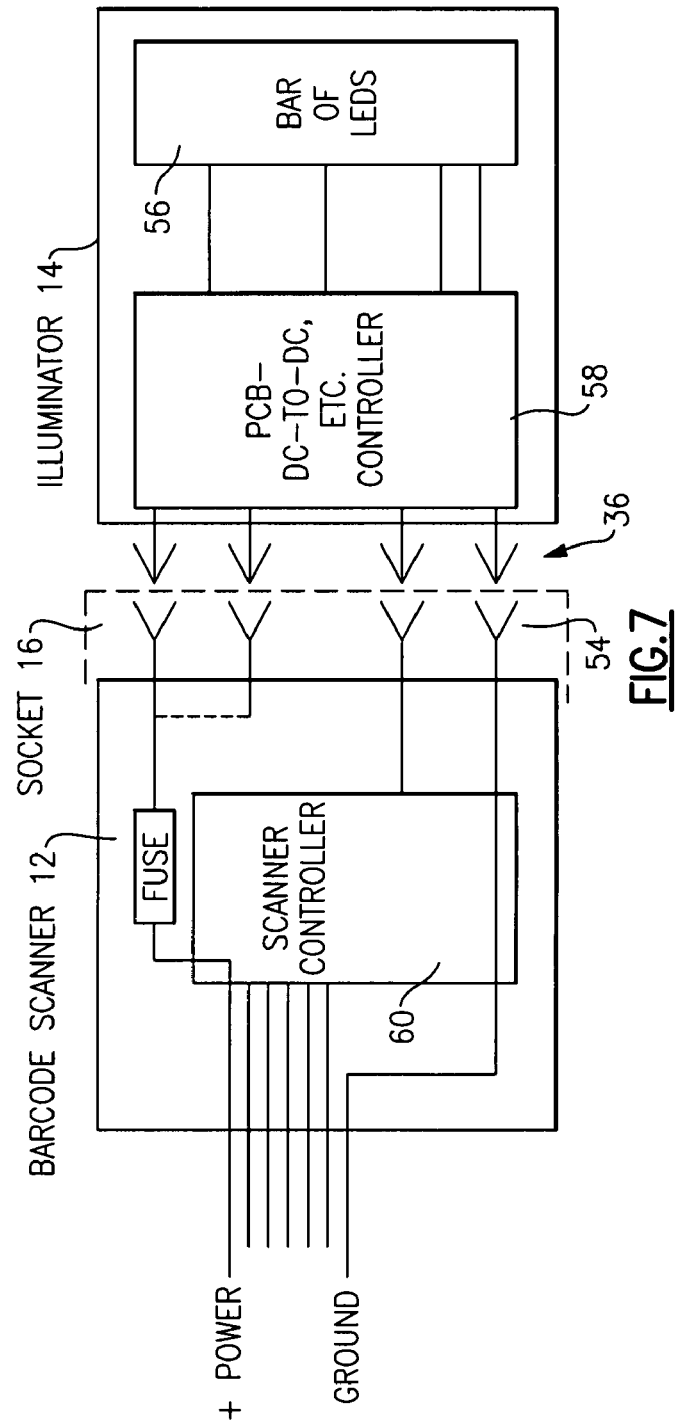
FIG. 7 is a schematic diagram for showing the electrical connections employed in this embodiment.

FIG. 7 schematically illustrates the salient items of circuitry employed between the scanner 12 and the attachment 14. Here, the circuit board 58, which contains DC-DC converter and controller circuit modules, is connected at one side to the plug-in electrodes 36 and at the other side to the bar of LEDs 56. Inside the bar code scanner 12 is a scanner controller board 60, with a number of power and data conductors (shown as extending to the left), and with a fused power conductor and ground conductor coupled to two of the connector electrodes 54 of the socket member 16. At least one circuit point on the scanner controller board 60 is coupled to another of the connector electrodes 36 to sense when the illuminator attachment is plugged in to a battery operated device, so that the LEDs 56 are only illuminated at certain times as needed to conserve battery power.

Figure 8:
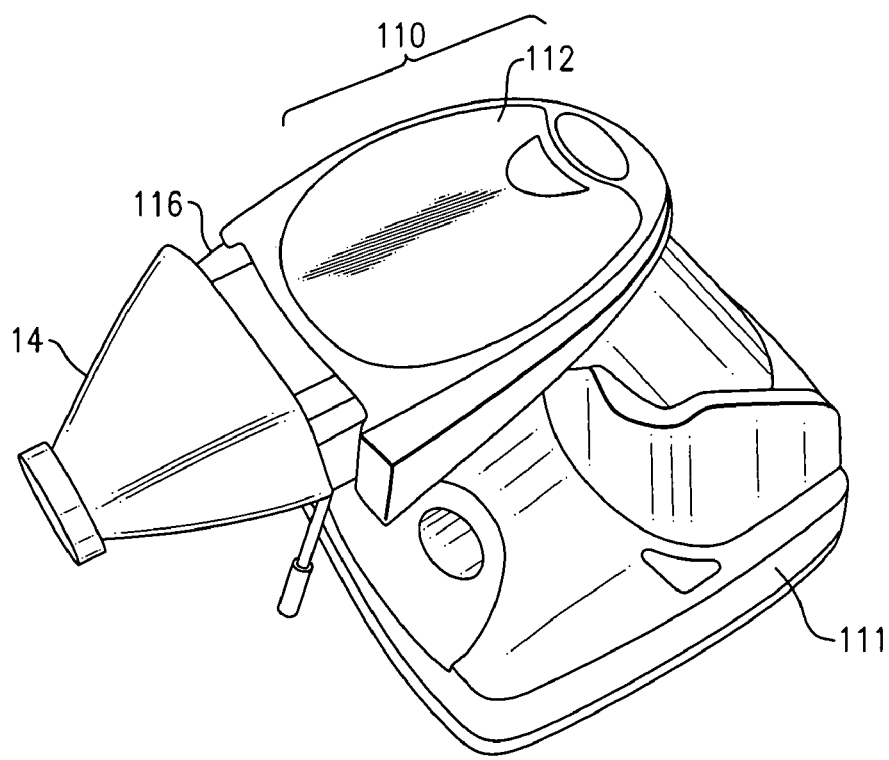
FIG. 8 is a perspective view of another embodiment of this invention.

FIG. 8 illustrates another scanner arrangement 110, here with a different hand-held optical scanner 112 seated on a battery-charging stand 111, and with an illumination attachment or module 14 plugged into a socket or receptacle 116 on the distal face of this scanner 112. This arrangement can be configured for low-angle illumination, or for reading bar codes on a mirror surface, for example.

Figure 9:
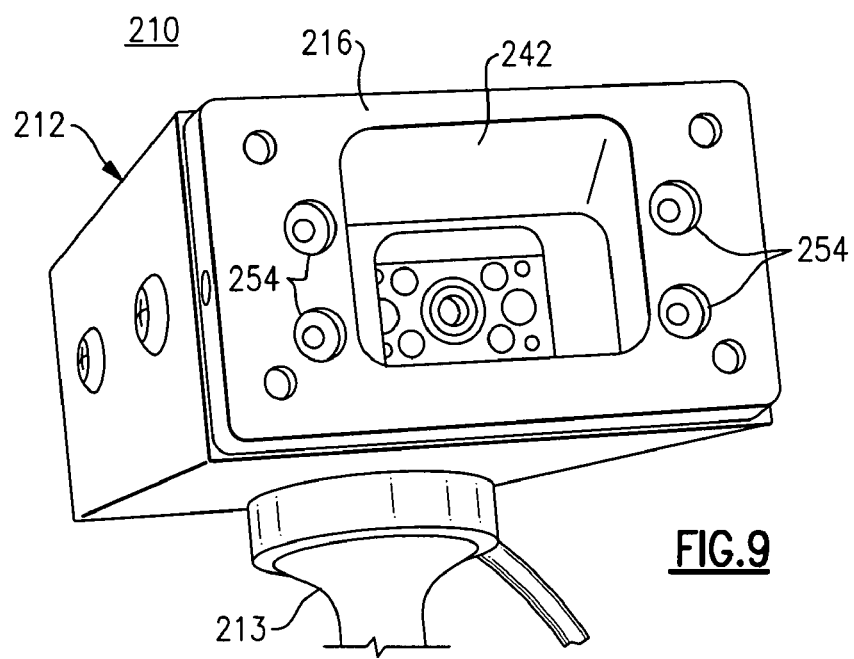
FIG. 9 is a front perspective view of a fixed-mount scanner with socket member, that can be employed with the illuminator module of an embodiment of this invention.

FIG. 9 shows an example of a fixed position bar code scanner arrangement 210, here with the scanner 212 shown mounted on a post or stand 213 for machine vision or automated reading of coded symbols or other optical symbols. This scanner is shown without the plug-in illuminator module. Here there is a socket member 216 affixed onto the distal side of the housing for the scanner 212, and the recess 242 and female socket-type connector electrodes 254 are shown. This scanner and socket member are designed to accommodate any of a variety of plug-in illumination attachments, including the attachment 14 described in detail earlier.

In some possible embodiments of the scanner, the external LEDs may be configured to produce white light or black light (e.g., far blue or near UV), and in such case the LEDs may require a forward voltage of three to four volts (or more). The arrangement may optionally be configured so that the internal LEDs 52 are enabled when the attachment 14 is absent, but disabled when the attachment is present The illuminator attachment modules discussed above do not have a battery or self-contained power supply, but that possibility may be appropriate in some applications. That opens up the possibility of optical or other wireless connections between the circuitry within the scanner device and that in the attachment module.

While the invention has been described with respect to some preferred embodiments, it should be understood that the invention is not limited to those specific embodiments. Rather, many modifications and variation would present themselves to persons skilled in this art without departing from the scope and spirit of this invention, as defined in the appended claims.

We claim:

1. An optical symbol scanner assembly for detecting and decoding an optical symbol, the assembly comprising:
   a hand-held compact, fixed-mounted, or mobile scanner device including
   a distal face at which is positioned a first light-generating means adapted for producing illumination to fall on said symbol;
   focusing means for focusing an image of said symbol on an imager device positioned within said scanner device, said focusing means defining an optic axis;
   electrical power and control circuitry for activating and powering said first light-generating means when triggered; and
   means for triggering said imager device and said electrical power and control circuitry;
   a removable and interchangeable illumination module adapted to be removably installed upon the distal face of said scanner device by pushing the illumination module in place thereon, the module including
   a body;
   an optical return pathway for permitting the light from the optical symbol to pass therethrough along said optic axis;
   a second illumination generating means within the illumination module body and adapted for generating illumination at a predetermined wavelength; and
   light directing means for conducting illumination from said second illumination generating means and directing it towards said symbol;
   a socket member fitted upon the distal face of said scanner device and over said first illumination generating means, and including
   a body portion having recess therein centered upon said optic axis; and
   a plurality of contact electrodes disposed outside said recess, the contact electrodes being coupled to respective circuit points of said electrical power and control circuitry; and
   a plug-in male member disposed on a proximal side of said illumination module, and including
   a projection thereon adapted to mate with the recess on said socket member and being centered on said optical return pathway; and
   a plurality of pin electrode members disposed outside said projection, and adapted to releasably contact the respective contact electrodes of said socket member, and connecting to said second illumination generating means in said illumination module, such that electrical power is provided to the second illumination generating means from said electrical power and control circuitry.

2. The optical symbol scanner according to claim 1, wherein said module includes a shroud, with said optical passageway having its optic axis aligned with the optic axis of said scanning device, said illumination generating means includes one or more diodes generating a predetermined black light wavelength, wherein said symbol is in the form of fluorescent markings that incorporate a material that responds to said black light wavelength to emit light of another wavelength; said light directing means includes a channel within the shroud for directing and guiding the black light emitted by said one or more diodes.

3. The optical symbol scanner according to claim 2, wherein said shroud is in the form of a hollow nosepiece having a narrow distal end that is transparent to said radiation at said black light wavelength and said other wavelength, and a tapered opaque shell that narrows in the direction towards the distal end, such that the radiation at said black light wavelength impinges on said symbol and the scanner device views the symbol as radiation at said other wavelength as produced by said fluorescent markings.

4. The optical symbol scanner assembly according to claim 1 wherein said shroud includes at its distal end a plate of a transparent material traversing across the optic axis.

5. The optical symbol scanner assembly according to claim 4 wherein said plate of transparent material is oriented at a non-right angle to said optic axis such that the black light impinging on said plate is not reflected directly back to said imager device.

6. The optical symbol scanner assembly according to claim 1 wherein said illuntination generating means includes a plurality of LEDs.

7. The optical symbol scanner assembly according to claim 6 wherein said second illumination generating means includes an electric drive circuit within said illumination module between said pin electrode members and said LEDs tat produces a forward voltage of exceeding three volts to said LEDs.

8. The optical symbol scanner assembly according to claim 1, wherein the recess of said socket member has a distal rectangular cavity of a first width and first length, and a second proximal rectangular cavity of a second width and second length, smaller than said first width and first length, respectively.

9. The optical symbol scanner assembly according to claim 8, wherein the projection of said male plug-in member has a proximal rectangular portion of said second width and said second length and a distal rectangular portion of said first width and said first length, such that said projection fits snugly into said recess, but may be pulled out by hand for interchange.

10. The optical symbol scanner assembly according to claim 9, wherein said contact electrodes include female recessed electrodes situated at right and left sides of said socket member outside said distal rectangular cavity.

11. The optical symbol scanner assembly according to claim 10, wherein said pin elecirode members include male probe contacts adapted to seat within respective ones of said female recessed electrodes.

12. The optical symbol scanner assembly according to claim 1, wherein said circuit points of said electrical power and control circuitry that are connected via said contact electrodes and said pin electrode members to the illumination generating means of said illumination module are operative to provide power, ground return, and trigger signal thereto.

13. The optical symbol scanner assembly according to claim 12, wherein said second illumination generating means is operative for generating illumination momentarily when triggered to conserve battery power.

14. The optical symbol scanner assembly according to claim 1, wherein said electrical power and control circuitry includes means for sensing presence of said removable and interchangeable illumination module, and means to enable said first light generating means when said module is absent, but to disable said first light generating means when said module is present.

15. The optical symbol scanner assembly according to claim 1 wherein said electrical power and control circuitry includes a scanner controller board, and said includes a circuit portion that is connected with one of said contact electrodes to sense when the illumination module is plugged in.

* * * * *

UNITED STATES PATENT AND TRADEMARK OFFICE
CERTIFICATE OF CORRECTION

| | | |
|---|---|---|
| PATENT NO. | : 7,370,801 B2 | Page 1 of 1 |
| APPLICATION NO. | : 11/481311 | |
| DATED | : May 13, 2008 | |
| INVENTOR(S) | : John R. Hattersley et al. | |

It is certified that error appears in the above-identified patent and that said Letters Patent is hereby corrected as shown below:

Col. 9, Claim 6, line 24:   "illuntination" should read --illumination--

Col. 9, Claim 7, line 30:   "tat" should read --that--

Col. 10, Claim 11, line 11:   "elecirode" should read --electrode--

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,370,801 B2  Page 1 of 1
APPLICATION NO. : 11/481311
DATED : May 13, 2008
INVENTOR(S) : John R. Hattersley et al.

It is certified that error appears in the above-identified patent and that said Letters Patent is hereby corrected as shown below:

Col. 9, Claim 6, line 24:  "illuntination" should read --illumination--

Col. 9, Claim 7, line 30:  "tat" should read --that--

Col. 10, Claim 11, line 11:  "elecirode" should read --electrode--

Signed and Sealed this

Sixteenth Day of September, 2008

JON W. DUDAS
*Director of the United States Patent and Trademark Office*